United States Patent
Smith

(10) Patent No.: US 10,442,520 B1
(45) Date of Patent: Oct. 15, 2019

(54) ENHANCED WING EFFICIENCY VIA DIFFERENTIAL THERMAL COEFFICIENT OF EXPANSION SPAR CAPS

(71) Applicant: NORTHROP GRUMMAN SYSTEMS CORPORATION, Falls Church, VA (US)

(72) Inventor: Charles R. Smith, Acton, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 23 days.

(21) Appl. No.: 15/934,327

(22) Filed: Mar. 23, 2018

(51) Int. Cl.
*B64C 3/18* (2006.01)

(52) U.S. Cl.
CPC .................. *B64C 3/185* (2013.01)

(58) Field of Classification Search
CPC ................ B64C 3/185; B64C 3/18
See application file for complete search history.

(56) References Cited

U.S. PATENT DOCUMENTS

| 4,662,587 A * | 5/1987 | Whitener ............... B29C 70/24 244/117 R |
| 5,496,002 A * | 3/1996 | Schutze ............... B29C 70/085 244/123.3 |
| 5,688,426 A | 11/1997 | Kirkwood et al. |
| 9,144,944 B1 | 9/2015 | White |
| 9,745,048 B2 | 8/2017 | Wood |
| 2005/0121945 A1 | 6/2005 | Browne et al. |
| 2009/0096325 A1* | 4/2009 | Barrett ............... H01L 41/0926 310/330 |
| 2013/0099063 A1* | 4/2013 | Grip ..................... B64D 27/24 244/219 |
| 2014/0370256 A1 | 12/2014 | Benthien et al. |
| 2016/0167764 A1* | 6/2016 | Grip ..................... B64D 27/24 244/123.4 |

FOREIGN PATENT DOCUMENTS

| EP | 0732262 A2 | 9/1996 |
| EP | 0941922 A1 | 9/1999 |
| EP | 3006189 A1 | 4/2016 |
| ES | 2263324 A1 | 12/2006 |
| GB | 793443 A | 4/1958 |

* cited by examiner

*Primary Examiner* — Jessica B Wong
(74) *Attorney, Agent, or Firm* — John A. Miller; Shumaker, Loop & Kendrick, LLP

(57) ABSTRACT

An aircraft structural component, for example, a wing spar that has an I-beam shape having upper and lower spar caps coupled by a web therebetween and that provides structural support for an aircraft wing. The wing spar may be fabricated as a graphite composite that is thermally cured to have a certain stiffness. In one embodiment, the wing spar is fabricated so that the upper spar cap has a higher CTE than the web, which creates tension forces in the spar cap when the spar is thermally cured and then cooled. Therefore, when the wing spar is mounted to the wing and the aircraft is in flight, compression forces on the wing skin act to relieve the tension forces in the spar cap, which reduces the compression buckling load on the wing.

17 Claims, 1 Drawing Sheet

ENHANCED WING EFFICIENCY VIA DIFFERENTIAL THERMAL COEFFICIENT OF EXPANSION SPAR CAPS

BACKGROUND

Field

This disclosure relates generally to an aerodynamic structural element on an aircraft that includes built-in tension to reduce compression loads on the element during flight and, more particularly, to a graphite composite main wing spar having an I-beam shape including upper and lower spar caps and a center web, where the spar caps have a higher coefficient of thermal expansion (CTE) than the web that causes them to be in tension after thermal curing, which reduces compression loading on the wing skin during aircraft flight.

Discussion

A fixed wing aircraft will have a lift-to-drag (L/D) ratio that is defined by the total aerodynamic lift generated by the aircraft divided by the total aerodynamic drag generated by the aircraft as it moves through the air, where the greater the L/D ratio the higher the aerodynamic efficiency of the aircraft. One of the principal techniques of obtaining a higher L/D ratio of the aircraft is to use wings that have a high aspect ratio, i.e., the length of the span of the wing divided by its width, where wings that are very long and narrow tend to produce higher L/D ratios. Unfortunately, high aspect ratio wings suffer from excessive structural loads due to wing bending, where the lift generated by the wing tends to bend the wing upward. This bending causes compression forces to develop in the upper surface of the wing and tensions forces to develop in the lower surface of the wing. The upper surface of the wing is typically considered the critical structural surface of the wing because it develops the compression loads in resonance to wing bending, where compression loads on long thin structural elements can cause these elements to buckle, which often occurs well before the structural element exceeds its compression limit.

Compression induced buckling on the upper surface of a wing is a major aircraft design consideration. Two methods that are typically employed to prevent wing buckling include enhancing the stiffness of the upper surface of the wing by adding reinforcement materials and decrease the aspect ratio of the wing. However, the first solution adds weight to the aircraft and the second solution reduces aircraft performance neither of which is desirable.

An aircraft wing generally needs to have a structural configuration that makes it very strong and stiff, but also allow it to be as light as possible. The structural configuration of an aircraft wing often employs a main wing spar having an I-beam shape that extends the length of the wing, where the spar includes upper and lower spar caps connected by a web. A series of ribs are generally coupled to and extend across the wing along the length of the spar. The wing spar typically carries the loads during flight and the weight of the wings while the aircraft is on the ground, and when the wing bends during lift, most of the compression loads are carried by the upper spar cap. Thus, the main wing spar and the wing skin are built and configured so that their inherent stiffness is high enough to prevent compression buckling as a result of aircraft lift.

SUMMARY

The present disclosure describes an aircraft structural component, for example, a wing spar that has an I-beam shape including upper and lower spar caps coupled by a web therebetween and that provides structural support for an aircraft wing. The wing spar may be fabricated as a graphite composite that is thermally cured to have a certain stiffness. In one embodiment, the wing spar is fabricated so that the spar caps have a higher coefficient of thermal expansion (CTE) than the web, which induces tension forces into the spar caps when the spar is thermally cured and then cooled. Therefore, when the wing spar is incorporated into the wing and the aircraft is in flight, the residual tension in the upper spar cap will tend to mitigate the compression forces caused by wing bending. The net effect delays the onset of wing buckling that permits the use of wings with higher aspect ratios.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a main wing spar including spar caps having a higher CTE than other parts of the spar to provide built-in tension that prevents or reduces compression buckling loads in the wing during flight is merely exemplary in nature, and is in no way intended to limit the disclosure or its applications or uses. For example, other aerodynamic parts of an aircraft where compression buckling loads may be a concern may also be configured with a built-in tension.

Figure 1:
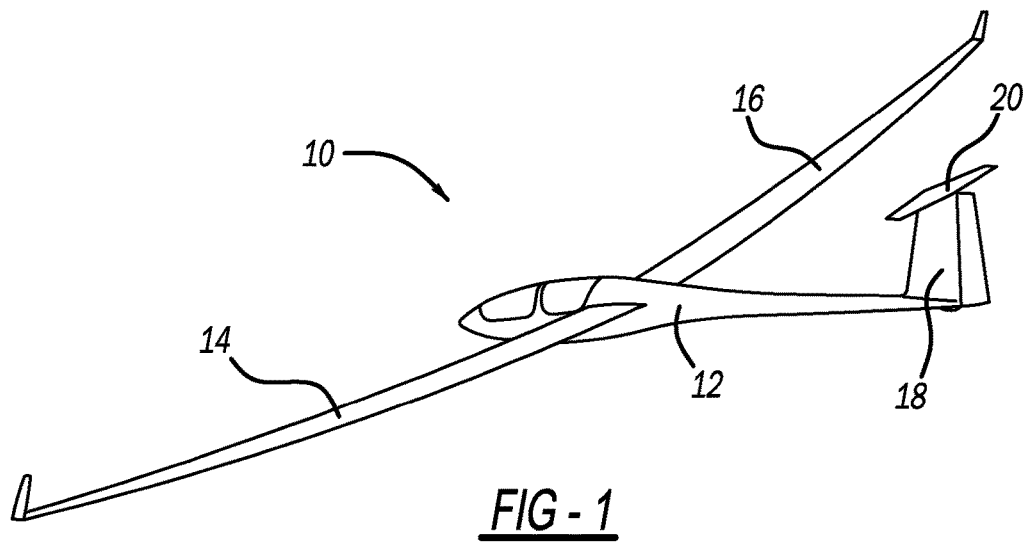
FIG. 1 is an isometric view of a fixed wing aircraft.

FIG. 1 is an isometric view of a fixed wing aircraft 10 including a fuselage 12, wings 14 and 16, a vertical stabilizer 18 and a horizontal stabilizer 20. It is noted that the aircraft 10 is intended to represent any type of fixed wing aircraft that can benefit from the disclosure below, including single engine aircraft, multi-engine aircraft, prop aircraft, jet engine aircraft, swept-wing aircraft, straight-wing aircraft, commercial aircraft, military aircraft, glider aircraft, commercial aircraft, fighter aircraft, etc.

Figure 2:
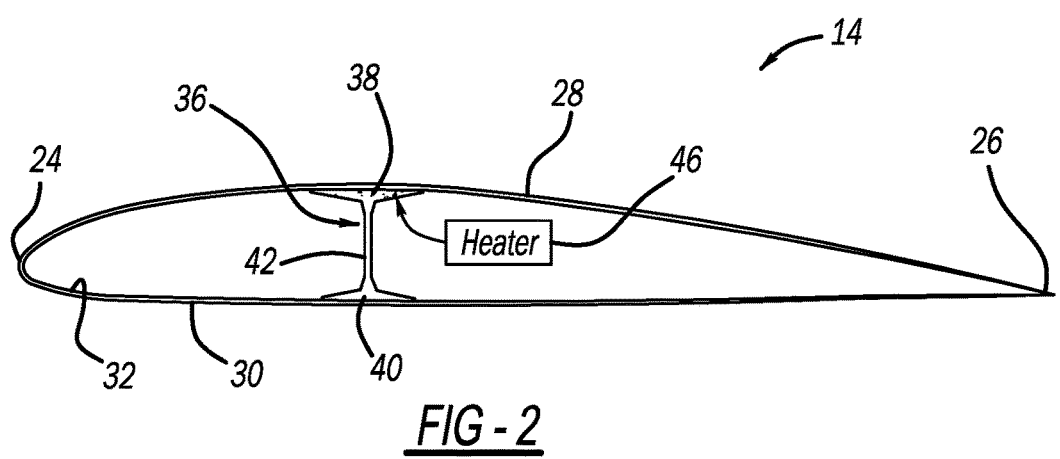
FIG. 2 is a cross-sectional type view of an aircraft wing including a main wing spar having an I-beam shape.

FIG. 2 is a cross-sectional type view of the aircraft wing 14 including a leading edge 24, a trailing edge 26, an upper wing skin 28 and a lower wing skin 30 all defining an internal chamber 32, where the other wing 16 has the same configuration. The thickness of the aircraft skins 28 and 30, the material of the aircraft skins 28 and 30, the length of the wing 14, the width of the wing 14, the size of the chamber 32, etc., can be any shape, dimension, material, parameter, etc. suitable for the purposes discussed herein. For example, the wing skins 28 and 30 may be aluminum, graphite composite, etc.

Figure 3:
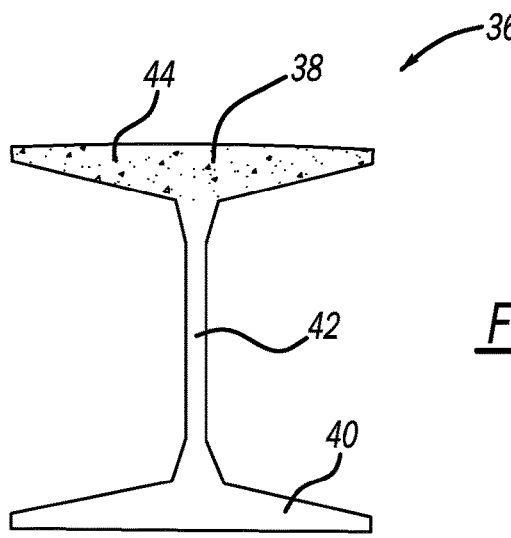
FIG. 3 is a cross-sectional type view of the main wing spar separated from the wing.

The wing 14 also includes a main wing spar 36 positioned within the chamber 32 and shown separated from the wing 14 in FIG. 3, where the wing spar 36 extends the length or most of the length of the wing 14. The wing spar 36 includes an upper spar cap 38 coupled to an inside surface of the upper skin 28, a lower spar cap 40 coupled to an inside surface of the lower skin 30 and a web 42 extending therebetween so that the spar 36 has a general I-beam shape.

The upper cap 38 can be secured to the skin 28 and the lower cap 40 can be secured to the skin 30 in any suitable manner, such as by a bonding agent, rivets, etc. It is noted that only the main wing spar 36 is shown in the chamber 32 as a structural element of the wing 14. However, as will be appreciated by those skilled in the art, other structural elements would likely also be employed, such as spaced apart ribs extending between the leading edge 22 and the trailing edge 24 and being coupled to the spar 36.

As will be discussed in detail below, the present disclosure proposes providing an induced or built-in tension in at least the upper spar cap 38. Therefore, when the wing spar 36 is incorporated into the wing 14 and the aircraft 10 is in flight, the residual tension in the upper spar cap 38 will tend to mitigate the compression forces caused by wing bending. The net effect will be to delay the onset of wing buckling that permits the use of wings with higher aspect ratios.

Although it may only be necessary to provide the built-in tension in the upper spar cap 38, it is likely that both of the spar caps 38 and 40 would need to have the built-in tension because if only the upper spar cap 38 was in tension, then the wing 14 would likely "warp" upwards to some degree. Thus, if both of the spar caps 38 and 40 are in equal tension, then the wing 14 will be tension balanced. The residual tension load in the lower spar cap 40 will act to accentuate the total tension in the spar cap 40 when the aircraft 10 is in flight. However, this will not be a serious drawback in most cases because the total acceptable tension load tends to be much greater than the load required to induce buckling. For those aircraft that may periodically fly inverted, such as fighter aircraft, acrobatic aircraft, etc., it is directly beneficial to provide the tension load in both of the spar caps 38 and 40. High performance aircraft must operate under high G loading and thus wing buckling is a critical design obstacle. By locking tension loads into the spar caps 38 and 40, and possible the wing skins 28 and 30, these limitations can be relieved.

In one embodiment, the spar caps 38 and 40 are configured to have a higher CTE than the web 42 so that they have the built-in tension. For this embodiment, the main wing spar 36 could be a graphite composite that is thermally cured to give it a desired stiffness, where such a thermally cured graphite composite for an aircraft component typically has a relatively low CTE. As is well understood by those skilled in the art, graphite composite wings are generally fabricated by laying down several carbon fiber ply layers on a tool, where each ply or sheet of the carbon fiber ply layers includes carbon fibers that have been impregnated with a powder resin, and where the fibers are woven into a fabric or tape. The stacked ply layers are vacuum compressed and sealed, and the tool and sealed part are then placed in an autoclave or heating oven to thermally cure the resin and form the hardened part. Any suitable technique can be employed to provide the higher CTE in the spars 38 and 40. For example, a different ply lay-up schedule is used for the spar web 42 than the ply lay-up schedule for the spar caps 38 and 40. The fiber direction of the web plies would be tailored to have a CTE near zero, but the spar plies would be configured so their CTE would be much higher. For example, Table I below shows various elements having a significant difference in CTE values depending on the direction that the fibers are laid down.

TABLE I

|  | Longitudinal Thermal Expansion ($10^{-5}$ K$^{-1}$) | Transverse Thermal Expansion ($10^{-5}$ K$^{-1}$) |
| --- | --- | --- |
| Glass | 5 | 5 |
| Kevlar (49) | −4 | 54 |
| Graphite (AS) | −1 | 10 |
| Graphite (HMS) | −1 | 10 |
| Boron | 5 | 5 |
| SiC | 5.2 | 5.2 |
| Saffil (5% SiO2-Al2O3) | 5.2 | 5.2 |
| Al2O3 | 8.5 | 8.5 |

In another embodiment, one type of material can be used for the spar web 42 having a low CTE and another material can be used for the spar caps 38 and 40 having a higher CTE. For example, if the web 42 is made of a graphite composite having a near zero CTE and the spar caps 38 and 40 are made of fiberglass having a high CTE, a tension load would be induced in the spar caps 38 and 40 after a thermal cure.

In another embodiment, the web 42 can be made of a graphite composite having a near zero CTE and the spar caps 38 and 40 can be made of a metal such has aluminum or titanium. In this example, the spar caps 38 and 40 are adhesively bonded to the web 42, and the spar 36 is thermally cured so that a tension load is locked into the spar caps 38 and 40 during the cool down from the thermal cure.

In another embodiment, a higher CTE in the spar caps 38 and 40 can be obtained by loading the spar caps 38 and 40 with a high CTE material such as metal particles 44 or metal foils, where the tension load in the spar caps 38 and 40 is induced by a thermal cure of the spar 36.

In another embodiment, a thermal cure is not relied on to obtain the different CTEs. Instead, the tension load in the spar caps 38 and 40 is induced mechanically. For example, the web 42 could be configured to have a near zero CTE and it would be cured without the spar caps 38 and 40. During cooling the web 42 would be placed in a jig that imposes a longitudinal compression load in the web 42 and the high CTE spar caps 38 and 40 would be attached to the web 42 by mechanical fasteners or by an adhesive. During release from the jig the compression load in the web 42 would induce a tension load in the now attached spar caps 38 and 40. Alternately, the spar caps 38 and 40 could be attached to the wing skins 28 and 30 as an assembly prior to attachment to the web 42. The spar caps 38 and 40 and the wing skins 28 and 30 would be placed in tension once the web compression load is relieved.

In an alternate embodiment, assuming a desirable reliability factor, it may be possible to provide some type of heating system within the wing 14 and making the wing spar 36 out of a suitable material that does not require a built-in tension, where heating of the spar cap 38 during flight causes the spar 38 to expand and create the tension forces that are desired. This embodiment is illustrated as heating element 46 in FIG. 2.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An aircraft wing comprising:
   an outer aircraft skin including an upper skin portion and a lower skin portion defining a chamber therebetween; and
   a wing spar extending some length of the wing and being positioned within the chamber, said wing spar including an upper spar cap coupled to an inside surface of the upper skin portion, a lower spar cap coupled to an inside surface of the lower skin portion, and a web formed to the upper and lower spar caps, wherein the upper spar cap is configured in a manner that causes it to have built-in tension so that compression forces on the upper skin portion during flight operate to reduce the tension in the upper spar cap, wherein the upper spar cap is configured to have a higher coefficient of thermal expansion (CTE) than the web to provide the built-in tension.

2. The aircraft wing according to claim 1 wherein both the upper and lower spar caps have a higher CTE than the web to provide built-in tension in both the upper and lower spar caps.

3. The aircraft wing according to claim 2 wherein the wing spar including the upper spar cap, the lower spar cap and the web is made of a graphite composite that is thermally cured.

4. The aircraft wing according to claim 3 wherein a different ply lay-up schedule is used for the web than a ply lay-up schedule for the spar caps where a fiber direction of the web plies is configured to have one CTE and a fiber direction of the cap plies is configured to have a higher CTE.

5. The aircraft wing according to claim 2 wherein the web and the spar caps are made of different materials.

6. The aircraft wing according to claim 5 wherein the web is a graphite composite and the spar caps are fiberglass.

7. The aircraft wing according to claim 5 wherein the web is a graphite composite and the spar caps are a metal.

8. The aircraft wing according to claim 7 wherein the metal is aluminum or titanium.

9. The aircraft wing according to claim 2 wherein the spar caps include high CTE metal particles or foils.

10. The aircraft wing according to claim 1 wherein the built-in tension is mechanically induced in the upper spar cap.

11. An aircraft component comprising:
    an aerodynamic portion that is under compression loading during aircraft flight; and
    a structural portion coupled to the aerodynamic portion that is configured in a manner so that it has built-in tension that operates to reduce the compression loading on the aerodynamic portion,
    wherein the component is an aircraft wing, the aerodynamic portion is a wing skin and the structural portion is a wing spar,
    said wing spar including an upper spar cap coupled to an inside surface of an upper skin portion, a lower spar cap coupled to an inside surface of a lower skin portion, and a web formed to the upper and lower spar caps, wherein the upper spar cap is configured in a manner that causes it to have built-in tension so that the compression forces on the upper skin portion during flight operate to reduce the tension in the upper spar cap,
    wherein the upper spar cap is configured to have a higher coefficient of thermal expansion (CTE) than the web to provide the built-in tension.

12. The aircraft component according to claim 11 wherein the structural portion is made of a graphite composite that is thermally cured.

13. The aircraft component according to claim 11 wherein the built-in tension is mechanically induced in the structural portion.

14. An aircraft wing comprising:
    an outer aircraft skin including an upper skin portion and a lower skin portion defining a chamber therebetween; and
    a graphite composite wing spar that is thermally cured and is positioned within the chamber and extends some length of the wing, said wing spar including an upper spar cap coupled to an inside surface of the upper skin portion, a lower spar cap coupled to an inside surface of the lower skin portion, and a web formed to the upper and lower spar caps, wherein the upper spar cap and the lower spar cap have a higher coefficient of thermal expansion (CTE) than the web so that the upper and lower spar caps are under tension after the spar is cooled so that compression forces on the wing during flight operate to reduce the tension in the upper or lower spar cap.

15. The aircraft wing according to claim 14 wherein a different ply lay-up schedule is used for the web than a ply lay-up schedule for the spar caps where a fiber direction of the web plies would be configured to have a CTE near zero and the spar plies would be configured to have a higher CTE.

16. The aircraft wing according to claim 14 wherein the spar caps include high CTE metal particles or foils.

17. The aircraft wing according to claim 14 wherein the aircraft wing is part of a fighter aircraft.

* * * * *